US008441955B2

(12) United States Patent
Wilkinson et al.

(10) Patent No.: US 8,441,955 B2
(45) Date of Patent: May 14, 2013

(54) DETERMINING MOBILE VIDEO QUALITY OF EXPERIENCE AND IMPACT OF VIDEO TRANSCODING

(75) Inventors: Robert Todd Wilkinson, Plano, TX (US); Aleksey G. Ivershen, Garland, TX (US)

(73) Assignee: Tektronix, Inc., Beaverton, OR (US)

( * ) Notice: Subject to any disclaimer, the term of this patent is extended or adjusted under 35 U.S.C. 154(b) by 286 days.

(21) Appl. No.: 13/012,056

(22) Filed: Jan. 24, 2011

(65) Prior Publication Data

US 2012/0188882 A1 Jul. 26, 2012

(51) Int. Cl.
*H04L 12/26* (2006.01)
(52) U.S. Cl.
USPC .......................................... 370/252; 370/236
(58) Field of Classification Search .................. 370/252, 370/236, 474, 476
See application file for complete search history.

(56) References Cited

U.S. PATENT DOCUMENTS

| | | | |
|---|---|---|---|
| 2005/0002453 A1 | 1/2005 | Chang et al. | |
| 2007/0268836 A1 | 11/2007 | Byum et al. | |
| 2008/0155087 A1 | 6/2008 | Blouin et al. | |
| 2010/0058436 A1* | 3/2010 | Maes | 726/1 |
| 2010/0195496 A1 | 8/2010 | Holm-Oste et al. | |
| 2011/0010585 A1* | 1/2011 | Bugenhagen et al. | 714/32 |
| 2011/0211464 A1* | 9/2011 | Chetlur et al. | 370/252 |
| 2011/0320607 A1* | 12/2011 | Harrang et al. | 709/226 |
| 2012/0155398 A1* | 6/2012 | Oyman et al. | 370/329 |

FOREIGN PATENT DOCUMENTS

| | | |
|---|---|---|
| EP | 2086174 A1 | 8/2009 |
| WO | WO 2011/104225 A1 | 9/2011 |

OTHER PUBLICATIONS

European Patent Office, "Extended European Search Report," EPO Application No. 12150768.5-2223/2480001, Aug. 7, 2012, (19 pages).
Cuadra-Sanchez, Antonio et al., "A generic monitoring architecture for assuring the QoS in mobile TV platforms," MELECON 2010, 15th IEEE Mediterranean Electrotechnical Conference, IEEE, Piscataway, NJ, Apr. 26, 2010, pp. 1227-1231.
Layaida O et al., "Reconfiguration-based QoS management in multimedia streaming applications," Euromicro Conference 2004 Proceedings, Rennes, France, Aug. 31-Sep. 2004, IEEE, Piscataway, NJ, Aug. 31, 2004, pp. 248-255.

* cited by examiner

*Primary Examiner* — Brian D Nguyen
(74) *Attorney, Agent, or Firm* — Edwards Wildman Palmer LLP; Scott D. Wofsy; George N. Chaclas

(57) ABSTRACT

Video data packets transmitted through a wireless network are captured by a network monitoring system. Video data sessions are detected from the video data packets. Key parameters are identified within the video data packets, such as video bit rate, resent or failed video packets, and video session duration. A Quality of Experience (QoE) is determined for some or all users associated with the video sessions based upon the key parameters. A header extension is added to the video data packets by a transcoding system. The header extension includes data associated with original and transcoded video data packets. The network monitoring system monitors the header extension and evaluates the effect of video transcoding upon the overall QoE for users. The monitoring system provides feedback to a transcoding policy engine based upon the effect of transcoding upon QoE.

21 Claims, 4 Drawing Sheets

DETERMINING MOBILE VIDEO QUALITY OF EXPERIENCE AND IMPACT OF VIDEO TRANSCODING

TECHNICAL FIELD

Embodiments are directed, in general, to monitoring video data transmission in mobile networks, and, more specifically, to evaluating the effect of video data transcoding on user Quality of Experience (QoE).

BACKGROUND

As mobile data networks continue to experience an unprecedented explosion in total network traffic, mobile devices consume large amounts of wireless network bandwidth. The increase in network traffic is largely driven by web-enabled smart phones and mobile-connected laptop computers. Within the overall network-growth trend, mobile video is expected to become the dominant consumer of mobile-data bandwidth.

With bandwidth demand exploding in mobile networks, service providers must expand their radio networks to keep up with data growth. However, adding radio transmitters to keep up with bandwidth growth is not always possible or economical. Building out the mobile networks to support these traffic volumes is expensive. All data ultimately originates or terminates at the user equipment, which requires transmission of the video data over scarce radio resources.

SUMMARY

Embodiments of a network monitoring system are directed to evaluating a user Quality of Experience (QoE) in a wireless network. The network monitoring system captures data packets from network interfaces in the wireless network and identifies video sessions associated with the captured data packets. The network monitoring system monitors key parameters for the video sessions within the captured data packets and determines an effective throughput per video session based upon the key parameters. The network monitoring system further calculates a QoE score for one or more users associated with the video sessions. The key parameters may comprise one or more of a video bit rate, a number of resent video data packets, a number of failed video data packets, and a video-session duration.

The network monitoring system may determine a video bit rate for each of the video sessions and then calculate the QoE score based at least in part upon the video bit rate for one or more video sessions. Alternatively or additionally, the network monitoring system may detect occurrences of resent or failed video data packets and calculate the QoE score based at least in part upon a number of resent or failed video data packets, and/or determine a duration of a selected video session and calculate the QoE score based at least in part upon the duration of the selected video session.

A video transcoding device may insert a header extension comprising summary data into transcoded video data packets associated with the video sessions. The network monitoring system further evaluates an impact of video transcoding on the QoE and sends updates to a transcoding policy engine. The updates identify the impact of video transcoding on user QoE.

In another embodiment, a system for evaluating user QoE in a wireless network comprises a plurality of monitoring probes coupled to one or more network interfaces. The monitoring probes are adapted to capture data from the network interfaces. A processor is adapted to analyze the data captured from the network interfaces. The processor identifies video data within the data captured from the network interfaces and identifies one or more video sessions associated with the video data. The processor further determines an effective throughput for the one or more video sessions; and determines a QoE score for one or more users associated with the video sessions. The QoE score is based upon the effective throughput of the one or more video sessions.

The processor may be part of a network monitoring system and may further identify key parameters within the video data, determine video bit rates for the one or more video sessions, detect resent or failed video data packets associated with the one or more video sessions, and/or detect durations of the one or more video sessions. The processor then determines the effective throughput for the video sessions based at least in part upon the key parameters, the video bit rates, the resent or failed video data packets, and/or the durations of the video sessions.

Transactional analysis can be used to determine video QoE. In one embodiment, a QoE evaluation process running on the network monitoring system maintains a record of video transactions for some or all users as well as a transactional record of any video delivery. The QoE evaluation system identifies the following scenarios and characterizes the associated session as having a low or poor QoE:

video data that is delivered at less than a target bit rate;
video data sessions that are aborted after short playback;
multiple starts and stops for the same video data session;
multiple retries attempting to send the same video content; and
video data sessions having abnormal behavioral or temporal characteristics.

Other factors associated with the video transactions can be use to derive user QoE. For example, by analyzing video transactions, the monitoring system can determine an original video bit rate, a transcoded bit rate, an effective throughput for video sessions, the number of failed or resent packets, and the video-session duration. Additional information can also be used to determine the user QoE. For example, spikes, halts, and buffering of video data can be used to determine a temporal throughput distribution. Also, retries wherein the user restarts the stream over and over, aborts in which the user stops the video session very quickly, multiple starts and stops within one session, and other video stream characteristics can be used to evaluate QoE.

The system for evaluating user QoE may further include a video transcoding device that is under control of a network policy management entity. The video transcoding device may be coupled to the network interfaces and adapted to modify a data rate for the video data. The video transcoding device may also be adapted to insert summary data into video data packets. The summary data can be inserted into the video data packets as a header extension. The summary data may include data associated with original and adapted video data, including a codec, bit-rate, and resolution for original data received at the video transcoding device from a video source, and a codec, bit-rate, and resolution of transcoded video data that is sent from the video transcoding device to a user.

The processor in the network monitoring system also monitors the transcoding summary data in the video data packets and determines an impact of video transcoding on the QoE score for the one or more users. The processor sends feedback to the network policy management entity. The feedback indicating the impact of the video transcoding.

In an alternative embodiment, a system for monitoring effects of video transcoding on user QoE in a wireless network comprises a video transcoding device adapted to modify a data rate for video data packets being sent through the wireless network to wireless network subscribers. The video transcoding device is further adapted to insert summary data into video data packets. A network policy management entity is adapted to enforce policies associated with the wireless network. The network policy management entity is coupled to the video transcoding device and provides information regarding transcoding of the video data packets. Monitoring probes are coupled to one or more network interfaces. The monitoring probes are adapted to capture video data packets from the network interfaces. A processor is adapted to analyze the captured packets.

Monitoring probes may be located before and after a transcoding device so that original, unmodified (i.e. not transcoded) video packets can be captured before the transcoding device. Additionally, transcoded video packets are captured from one of the links between the transcoding device and the user equipment. The transcoded video packets may be captured immediately after the transcoding device, or from a link closer to the user equipment. The processor determines a first QoE score and a second QoE score for the one or more subscribers. The first QoE score is associated with video data that has not been transcoded in the video transcoding device, and the second QoE score is associated with video data that has been transcoded in the video transcoding device. The processor identifies the impact of video transcoding on the network QoE by comparing the first and second QoE scores. The processor then generates feedback messages to the network policy management entity. The feedback messages comprise information associated with the impact on network QoE due to video transcoding.

The network policy management entity is adapted to enforce the policies by controlling video transcoding parameters implemented by the video transcoding device. The network policy management may enforce the policies by limiting the video transcoding parameters that the video transcoding device is allowed to adjust.

The summary data inserted by the video transcoding device is associated with original and adapted video data, such as a codec, bit-rate, or resolution for original data received at the video transcoding device from a video source or for transcoded video data that is sent from the video transcoding device to subscribers. The processor may further associate the summary data with the first QoE score and the second QoE score to identify the impact on network QoE due to video transcoding.

BRIEF DESCRIPTION OF THE DRAWINGS

Figure 1:
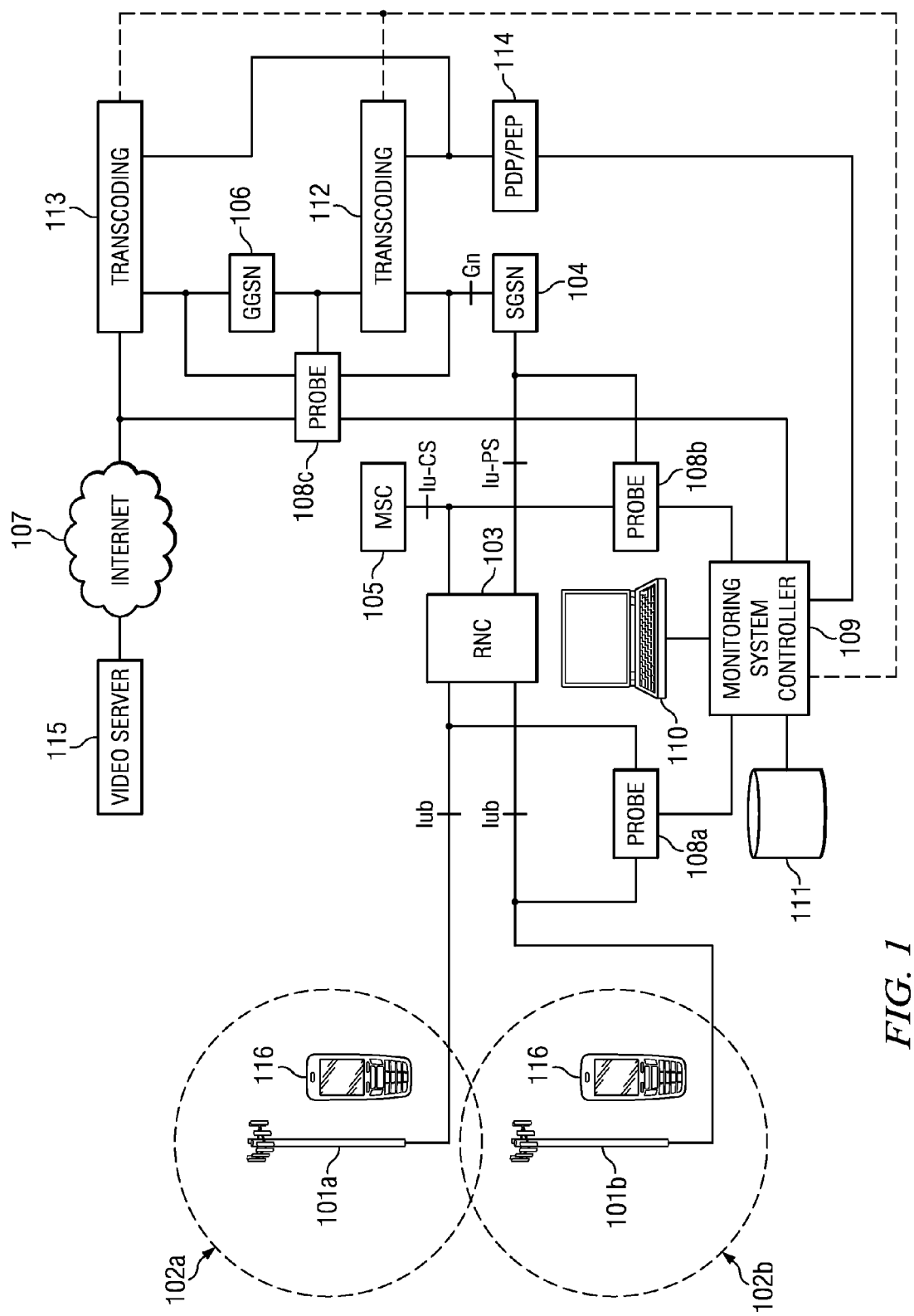
Figure 2:
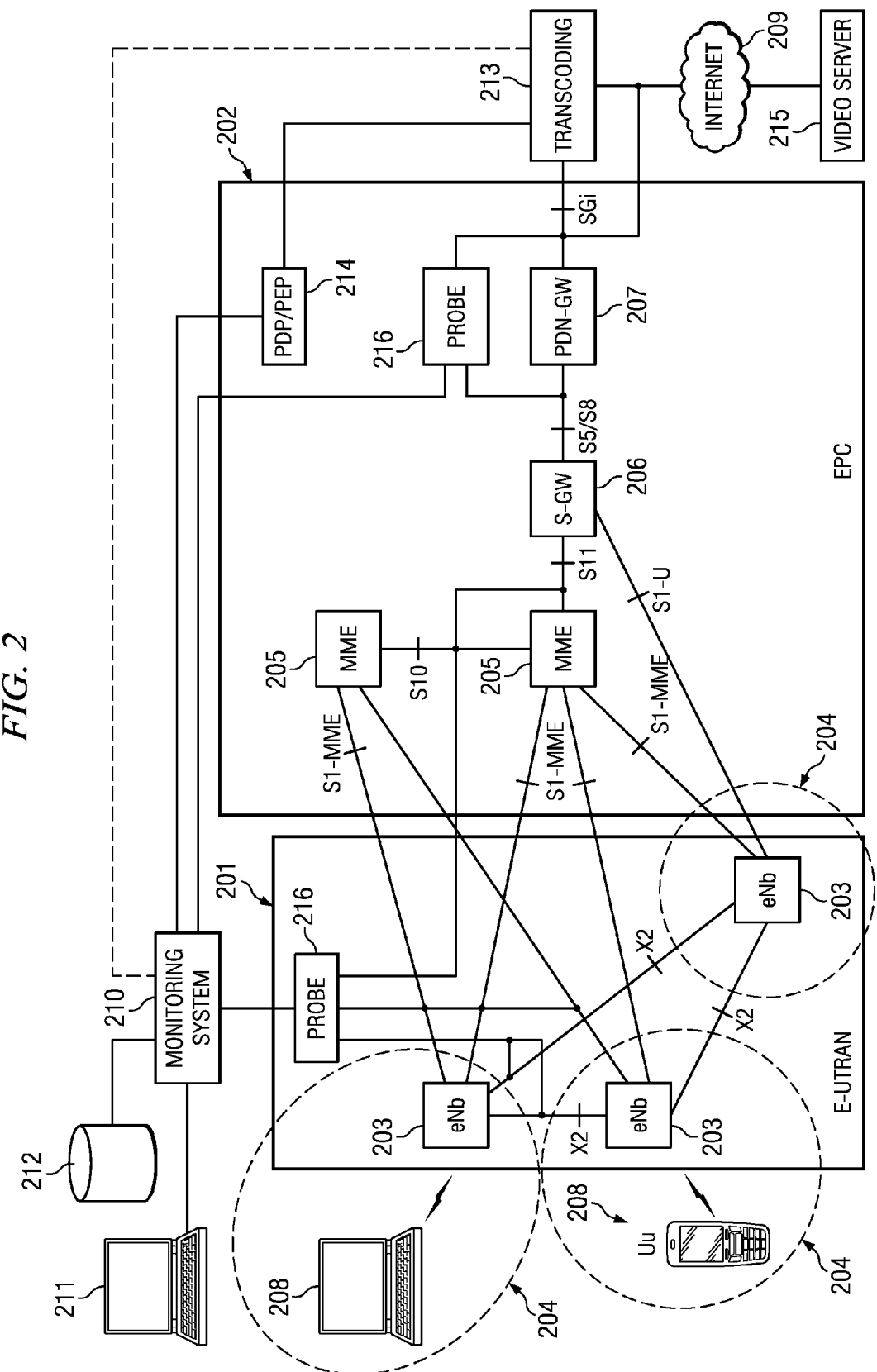
Figure 3:
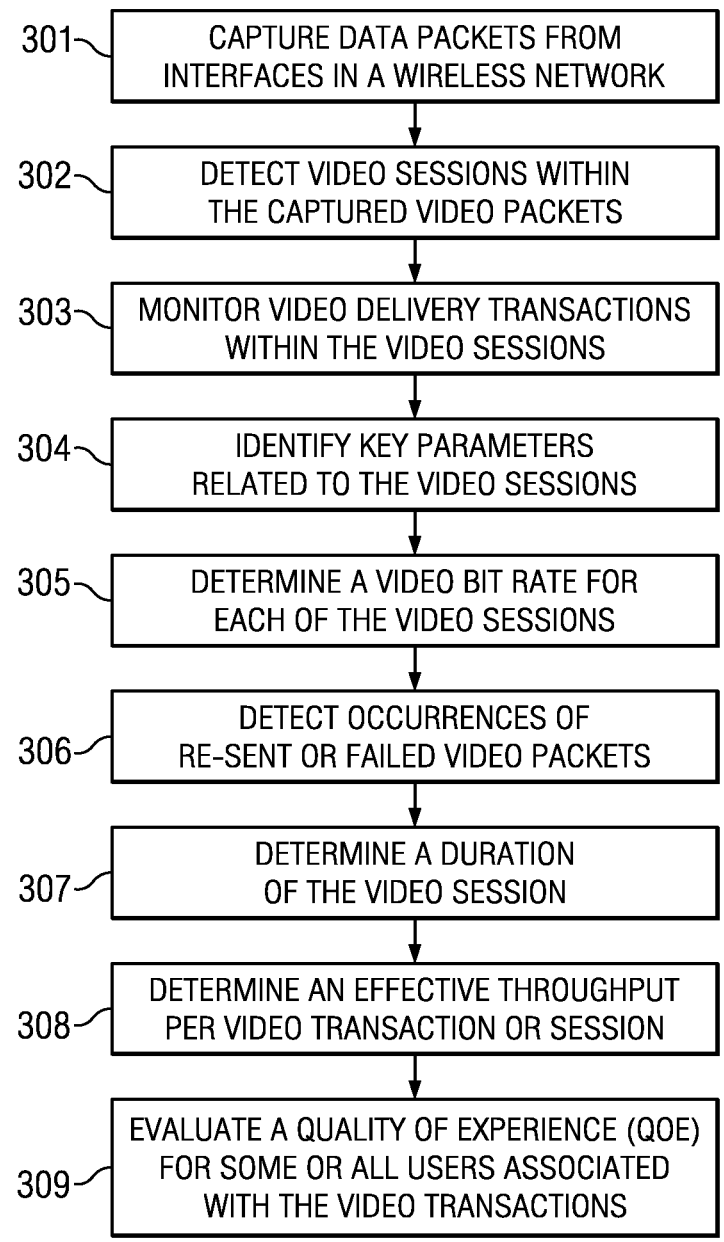
Figure 4:
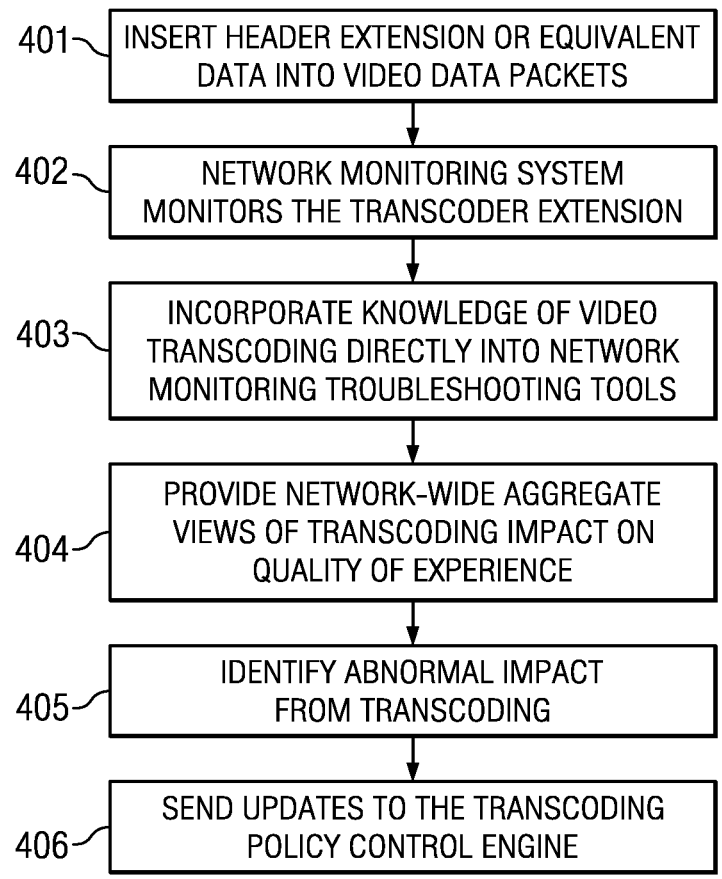

Having thus described the invention in general terms, reference will now be made to the accompanying drawings, wherein:

FIG. 1 is a high-level block diagram illustrating the components of a Universal Mobile Telecommunications System (UMTS) 3GT network;

FIG. 2 is a block diagram illustrating the LTE (Long Term Evolution)/SAE (System Architecture Evolution) 4G network architecture; and FIG. 3 is a flowchart illustrating a process for determining QoE according to one embodiment; and FIG. 4 is a flowchart illustrating a process for using video transcoding data and QoE feedback according to one embodiment.

DETAILED DESCRIPTION

The invention now will be described more fully with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

As mobile data networks experience unprecedented growth in total network traffic, mobile network operators face unique challenges. Service providers need to maintain sufficiently high quality of service (QoS) levels to minimize churn and maximize service revenue. Historically this was a relatively simple problem to solve for networks that were focused primarily on mobile voice. With the advent and explosion of mobile video traffic, it has become more difficult to maintain high QoS levels.

Typical techniques for determining video QoS rely on reconstructing the video transport streams. These methods are likely to be ineffective in evaluating mobile video QoS, and reconstructing video transport streams will not work with future delivery methods. Video content transmission is moving towards delivery over TCP/HTTP where quality is a function of the effective data throughput and the client buffer size. By definition, TCP/HTTP guarantees reliable delivery of the content. Also, video content reconstruction is an expensive operation and would not scale well with the projected growth in mobile video in a cost effective way. In one embodiment of the system described herein, a monitoring system derives video Quality of Experience (QoE) without reconstructing the video stream.

FIG. 1 is a high-level block diagram illustrating the components of a Universal Mobile Telecommunications System (UMTS) 3G network, which may include UTRAN (Universal Terrestrial Radio Access Network) and GERAN (GSM EDGE Radio Access Network) elements. A plurality of NodeB network elements 101 serve subscribers in respective cells 102 and are connected to RNC 103 via an Iub interface. The RNC 103 is coupled to SGSN 104 via an Iu-PS interface and to MSC 105 via an Iu-CS interface. SGSN 104 is coupled via a Gn interface to GGSN 106, which provides access to Internet 107. User equipment (UE) 116 within a cell 102 communicates with the respective NodeB 101.

A monitoring system, including, for example, probes 108 and monitoring system controller 109 are coupled to the Iub and/or the Iu interfaces. Probes 108 collect PDUs and session data from the interfaces, such as RRC and NBAP messages from the Iub interfaces and ALCAP and RANAP messages from Iu interfaces. A service provider or network operator may access data from monitoring system 109 via user interface station 110. Monitoring system 109 may further comprise internal or external memory 111 for storing captured data packets, user session data, call records configuration information, and software application instructions.

The monitoring system may be located in one location, such as a server or equipment rack in which probes 108a-c run on separate blades. Alternatively, probes 108a-c may be located near RNC 103 or SGSN 104 and remote from monitoring system controller 109. Probes 108a-c and monitoring system controller 109 comprises one or more processors running one or more software applications.

FIG. 2 is a block diagram illustrating the LTE (Long Term Evolution)/SAE (System Architecture Evolution) 4G network architecture. The LTE/SAE network technology represents mobile network evolution to provide high-rate IP-based services. The standardization entity in charge of specifying the mobile standards, which is known as the 3$^{rd}$ Generation Partnership Project (3GPP), has defined standards for mobile telecommunication systems, including both the radio access and the core network evolution. The standard is named Evolved Packet System (EPS), and it specifies the evolution of the UTRAN access network—the evolved UTRAN (eUTRAN) 201—and the concurrent evolution of the Core network—the Evolved Packet Core (EPC) 202. LTE and SAE are commonly used synonyms for eUTRAN 201 and EPC 202, respectively.

The network comprises a number of different types of network nodes and interfaces. The nodes include, for example, enhanced NodeBs (eNodeB or eNb) 203 that services subscribers in cells 204, Mobility Management Entity (MME) 205, Serving Gateway (S-GW) 206, and Packet Data Network Gateway (PDN-GW) 207. The interfaces between the nodes in the EPC domain are generally named "S#." The "X2" interface (between eNodeBs) and "Uu" interface (air interface between eNodeBs 203 and User Equipment 208) are in the eUTRAN domain.

The goal of the EPS technology is to significantly enhance the bandwidth available to users and, at the same time, improve the Quality of Service (QoS) of the radio connection. The following nodes operate within the eUTRAN domain. User Equipment (UE) 208 is the subscriber endpoint of the end-to-end services. UE 208 communicates over the Uu interface to eNodeBs 203 on the radio path. eNodeB 203 manages the radio path to UE 208 and hosts the physical radio establishment, radio link control, and medium access control functions. eNodeB 203 also encrypts and decrypts data toward the radio path and handles the radio resource admission and management.

The following nodes operate within the EPC domain. MME 205 is the node responsible for managing the non access stratum (NAS) control plane messages from/to the UE 208. In addition, MME 205 plays a role in selecting S-GW 206 for user plane traffic, coordinates handover in LTE/SAE, and establishes the necessary authentication and security procedures. MME 205 also coordinates the bearer assignment to the UE 208. S-GW 206 is the endpoint of user plane connections from eNodeB nodes 203. S-GW 106 is an anchor for user plane connections in case of UE handover between eNodeBs 203. PDN-GW (207) is the network node that provides an interface between the EPC with external PDN networks, such as the Internet 209.

In a complex system such as an LTE/SAE network, the tasks of measuring network performance, troubleshooting network operation, and controlling network service behavior can be very difficult for the network operator. Evolution of the network, such as the introduction and deployment of new network technology, causes additional instability and further problems in network measurement, troubleshooting and control. In order to perform these tasks, network operators often make use of external monitoring systems, such as monitoring system 109 (FIG. 1). These monitoring systems are typically connected to the network in a non-intrusive mode that allows them to sniff data from the network interfaces, processing the data and provide measurements and reports that help the network operator to manage its network. The monitoring system typically needs to track the UEs' activities in order to provide detailed analysis of the services used by the subscribers and to collect information about the network's behavior for troubleshooting and optimization purposes.

A monitoring system 210 may be coupled to links in the LTE/SAE network via one or more probes 216 to passively monitor and collect signaling data from one or more interfaces in the network. Monitoring system 210 may collect user plane and control plane data from the EPC and eUTRAN interfaces, including, for example, the S1-MME, S10, and S11 interfaces that have an MME 205 as an endpoint and S1-MME and X2 interfaces that have an eNodeB 203 as an endpoint. It will be understood that some or all of the other interfaces or links in the network may also be monitored by monitoring system 210. The monitoring system 210 may comprise, in one embodiment, one or more processors running one or more software applications that collect, correlate and analyze Protocol Data Units (PDU) and data packets from eUTRAN 201 and EPC 202.

A service provider or network operator may access data from monitoring system 210 via user interface station 211. Monitoring system 210 may further comprise internal or external memory 212 for storing captured data packets, user session data, call records configuration information, and software application instructions.

The monitoring systems 108-111 (FIG. 1) and 210-212 (FIG. 2) may incorporate protocol analyzer, session analyzer, and/or traffic analyzer functionality that provides OSI (Open Systems Interconnection) layer 2 to layer 7 troubleshooting by characterizing IP traffic by links, nodes, applications and servers on the network. Such functionality is provided, for example, by the GeoProbe G10 platform, including the Iris Analyzer Toolset applications and Splprobes, from Tektronix Incorporated. It will be understood that the monitoring systems illustrated in FIGS. 1 and 2 are simplified and that any number of interconnected monitoring system probes may be coupled to one or more interfaces within the networks. A single monitoring probe may capture data from a particular interface, or two or more probes may be coupled to one interface.

The monitoring systems may be coupled to network interfaces via packet capture devices, such as high-speed, high-density probes that are optimized to handle high bandwidth IP traffic. The monitoring system passively captures message traffic from the interfaces without interrupting the network's operation. The monitoring system may capture and correlate the packets associated with specific data sessions on network interfaces. The related packets can be combined into a record for a particular flow, session or call on the network. In an alternative embodiment, the monitoring system may be an active component, such as a software agent, that resides on an MME or RNC, for example, and that captures data packets passing into or out of the node.

Streaming video that originates from prerecorded video files or from live video feeds is very popular with subscribers on 3G and 4G wireless networks. The video stream typically originates at a source outside the mobile network and often must be accessed via the Internet (107, 209). For example, a wireless subscriber (e.g. UE 108 or 208) may establish a data session with a remote video server (115, 215). In a 3G network (FIG. 1), the data session is created through RNC 103, SGSN 104 and GGSN 106 to Internet 107 and then to the video source 115. In a 4G network (FIG. 2), the data session is created through MME 205, S-GW 206, and PDN-GW 207 to Internet 209 and again to the video source 215. The wireless subscriber selects stored video files or live video feeds from the video source (115, 215), such as via a webpage hosted on a server.

The video server begins sending video data packets for the selected video through the Internet and across the 3G or 4G network to the subscriber. The video packets comprise video information that has been compressed using a selected video compression protocol. The rate at which the video information may be transmitted through the 3G or 4G networks is determined by the current capability of the network links. If the network is experiencing a high traffic load, the network may not have sufficient bandwidth to establish the video connection. In the event that the session is established between the UE and the video source, the video packets may be delayed.

The network monitoring system disclosed herein derives video Quality of Experience (QoE) information without needing to reconstruct the original video stream. The network monitoring system detects video delivery transactions and identifies the key parameters related to the video to be delivered, such as the video bit rate, occurrence of resent or failed video packets, and the duration of the video session. The network monitoring system also tracks the behavioral and temporal characteristics of the video content delivery, such as packet delivery by time. The network monitoring system then determines the effective throughput per video transaction or session.

A QoE evaluation process running on the network monitoring system maintains a record of video transactions for some or all users as well as a transactional record of any video delivery. The QoE evaluation system identifies the following scenarios and characterizes the associated session as having a low or poor QoE:

video data that is delivered at less than a target bit rate;
video data sessions that are aborted after short playback;
multiple starts and stops for the same video data session;
multiple retries attempting to send the same video content; and
video data sessions having abnormal behavioral or temporal characteristics.

Other factors associated with the video transactions can also be use to derive user QoE. For example, by analyzing video transactions, the monitoring system can determine an original video bit rate, a transcoded bit rate, an effective throughput for video sessions, the number of failed or resent packets, and the video-session duration. Additional information can also be used to determine the user QoE. For example, spikes, halts, and buffering of video data can be used to determine a temporal throughput distribution. Also, retries wherein the user restarts the stream over and over, aborts in which the user stops the video session very quickly, multiple starts and stops within one session, and other video stream characteristics can be used to evaluate QoE.

It will be understood that other parameters may also be used to characterize or evaluate the video session. Moreover, each of the parameters may be assigned the same or different weights for evaluating the overall QoE. For example, occurrences where video data is delivered at less than a target bit rate may have less effect on QoE, or may reduce a QoE rating less, than video data sessions that are aborted.

In one embodiment, the monitoring system sorts the video data session information by subscriber, and the QoE for each video transaction may be evaluated separately. The monitoring system may assign a maximum QoE score to each video data session when the video data session is initiated. The monitoring system then decrements the QoE score each time certain parameters are observed. For example, the monitoring system may assign a maximum QoE score when a subscriber request for a particular video is detected. As the video data is being provided to the subscriber, the monitoring system identifies whether particular pre-determined events occur. These events may include, for example, failure of an actual video bit rate to maintain a minimum level, failure of an entire video file to transfer to the subscriber, delays or breaks in video data transmission that exceed a predetermined duration, multiple transmissions of the same video data packets, and video data that is transmitted to the subscriber out of order. When these and other events are observed, the QoE score for the video session is reduced.

In other embodiments, the QoE scores for multiple video sessions may be combined by straight averaging or by weighted averaging, for example. Weighted averages may assign certain users or certain events a higher weight. Multiple video sessions for a single user or for a group may be combined. A QoE score may be determined for a group of users based on how successful and/or timely the video data was transmitted to the subscribers in the group. Multiple video sessions may be evaluated for each member of the group. In further embodiments, the QoE derivation may be enhanced using fuzzy logic or other machine learning technique to improve overall accuracy.

FIG. 3 is a flowchart illustrating a process for determining QoE according to one embodiment. In step 301, data packets are captured from interfaces in a wireless network. The data packets may be captured by a network monitoring system, for example. In step 302, video sessions are detected within the captured video packets. The video delivery transactions within the video sessions are monitored in step 303. The network monitoring system or other QoE measurement system identifies key parameters related to the video sessions in step 304.

A video bit rate is determined for each of the video sessions in step 305, and occurrences of resent or failed video packets are detected in step 306. In step 307, a video-session duration is determined. An effective throughput per video transaction or session is then determined in step 308. Finally, in step 309, a quality of experience (QoE) is determined for some or all users associated with the video transactions.

The QoE may be determined based upon detection of video data that is delivered at less than a target bit rate, video data sessions that are aborted after partial playback, multiple starts and stops for a single video data session, multiple retries attempting to send the same video content, and video data sessions having abnormal behavioral or temporal characteristics.

Service providers may deploy transcoding-based optimization solutions within wireless networks to handle the impact of the explosive growth of mobile video demand. On embodiment of a transcoding-based optimization solution is described and disclosed in pending U.S. patent application Ser. No. 12/980,199, titled "Adaptive Control of Video Transcoding in Mobile Networks," which was filed Dec. 28, 2010, the disclosure of which is incorporated herein by reference in its entirety.

For example, the data rate for video data being transmitted through a wireless network may be adjusted based upon cell congestion levels. A network monitoring system identifies the congestion levels in network cells based upon data traffic captured from network interfaces. When a cell congestion level reaches a first level, an alert is sent to a video transcoding device. The video transcoding device adjusts the data rate for video data being sent to one or more subscribers in the congested cell. The data rate adjustments may be based upon a subscriber profile or a user equipment type. When cell congestion levels drop below a second threshold, the monitoring system sends a second alert indicating that the video data rate can be increased.

In some situations, may be the video packets may not reach the subscriber at a sufficient rate for the UE to accurately display the selected video. The UE may display video that freezes while waiting for the next video data. Subscribers usually find this type of video difficult to watch and the result is a low Quality of Experience (QoE) for video services on the network. For example, if a selected video requires 800 kpbs, but the mobile network only has 500 kbps capacity available, then the network may not establish the session. If the network does establish a session, the available bandwidth will not all delivery of the video at 800 kbps, which will result in an extremely poor experience for the subscriber. At best, the subscriber will see a start/stop playback as the UE continually runs out of buffered data and then has to refill the buffer.

Video transcoding may be used to optimize video delivery over mobile 3G and 4G networks. Typically, transcoding devices are designed to transcode video content to a lower bit rate. For example, video packets that are originally transmitted at 800 kbps can be re-encoded by the transcoder to 400-500 kbps with very little degradation in user-perceived quality. Transcoding can also be applied to reduce screen resolution where appropriate. Most subscriber equipment, such as mobile phones and PDAs, has a small display screen. Images usually can be displayed at a lower resolution on these small screens without significant loss of user enjoyment. The video data may be reduced by reducing the screen resolution, which may result in a lower overall data rate that can be supported by the network.

The video data is transcoded to a lower bit rate prior to entering the mobile network or at the edge of the network. Then the transcoded, lower-rate data is sent to the subscriber. These bit-rate reductions correspond to direct savings in network utilization which provides two significant benefits to mobile operators: reduced capex/opex (the same content can be delivered with less infrastructure) and improved QoE (optimizing the bandwidth enables more users to have good QoE).

While the use of video transcoding is effective, there is no current solution to use transcoding in an adaptive manner based upon real-time knowledge of the mobile network's conditions. Instead, current solutions assume a certain level of available bandwidth and then reduce all video data rates without regard to actual network conditions. Without feedback or network condition information, the transcoding process has to be configured in a static manner. The operator may at best designate different transcoding settings by time of day. Additionally, the video transcoding systems have no knowledge of, or feedback regarding, the network resources that are impacted by a particular optimization decision. Using a network intelligence system, such as the network monitoring systems described above, real-time data is available that can be used to select a transcoding rate in a way that optimizes QoE and resource usage based on what is actually occurring in the network.

In a 3G network, such as illustrated in FIG. 1, transcoding may be performed before or after GGSN 106 at location 112 or 113. A Policy Decision Point (PDP)/Policy Enforcement Point (PEP) 114 may control transcoding 112, 113 based upon information from the monitoring system. For example, when monitoring system 109 identifies cell congestion in cell 102a or 102b, the monitoring system 109 notifies PDP/PEP 114 of the congestion level. PDP/PEP 114 then directs transcoding 112, 113 to use a lower video data rate for packets addressed to UE in the congested cell or cells. In other embodiments, the monitoring system identifies cell congestion limitations directly to the transcoding equipment 112, 113 without using PDP/PEP 114. Similarly, in a 4G network, as illustrated in FIG. 2, the transcoding may be performed by element 213 between PDN-GW 207 and Internet 209. PDP/PEP 214 may control transcoding 213 using information from monitoring system 210. The monitoring system may communicate with other network policy management entities, such as a Policy Enforcement Point (PEP), a Policy Decision Point (PDP), a Policy Charging and Control (PCC) function, a Policy and Charging Rules Function (PCRF), or a Policy and Charging Execution Function (PCEF), to control transcoding in the network.

Embodiments of the monitoring system also support other adaptive transcoding scenarios. The monitoring system may classify video traffic into customer segments, such as by identifying high-value or non-high-value subscribers or certain equipment types, and then apply different transcoding schemes to enhance QoE for desired segments. The monitoring system may also monitor radio key performance indicators (KPIs), such as interference levels, and apply different transcoding schemes to improve QoE issues caused by radio impairment.

A service provider may establish policies that control how transcoding is handled within the network. The benefits of transcoding can be maximized using the monitoring system information. In the presence of network congestion, more users can continue to receive video by using more aggressive transcoding optimization. In the absence of network congestion, user experience is enhanced by using less aggressive transcoding, thus improving video quality. In any scenario, carrier network infrastructure may be reduced for any network with a predominance of mobile video traffic, which is expected for all mobile networks in the near future. Reduced infrastructure means immediate capex avoidance and ongoing opex savings.

Using the systems and methods described and disclosed above, it is possible to efficiently derive QoE for mobile video using a network monitoring system. However, there is currently no mechanism to ensure that video transcoding does not have a negative impact on user experience. Additional embodiments of the network monitoring systems and methods described herein correlate QoE data back to policy decisions that are made or enforced at the video transcoder to ascertain whether the selected video transcoding had a desired effect on user experience. Further, the network monitoring system determines when the feedback fed to the video transcoder causes too aggressive optimization being performed. Thus, the mobile operator ensures closed-loop feedback for mobile video optimization to ensure the highest total QoE possible.

In one embodiment, the video transcoder system, such as transcoder 112, 113, or 213, inserts a header extension or equivalent data into control packets associated with the video stream. For example, header extension information may be inserted into HTTP header or RTSP control packets that are associated with establishing a video session. The header extension is labeled "x-video-transcoder:" in one embodiment. The header extension carries the original codec/bit-rate/resolution and the adapted or transcoded codec/bit-rate/resolution. The header extension is ignored by the end user's equipment, such as UE 108 or 208. However, the network monitoring system monitors the transcoder extension in the video data packets. The header extension or equivalent data may comprise summary information related to a transcoding process, such as data associated with original and adapted video data, such as a codec, bit-rate, or resolution for original data received at a video transcoding device from a video source, and a codec, bit-rate, or resolution of transcoded video data that is sent from the video transcoding device to subscribers.

The network monitoring system incorporates knowledge of the selected transcoding directly into network troubleshooting tools, such as a session analysis or a protocol analysis. The network monitoring system further provides network-wide aggregate views of the impact of video transcoding on QoE. An analysis engine in the network monitoring system identifies when transcoding causes an abnormal impact on the network. The abnormal impact may be, for example, a poor QoE or a drop in QoE following the start of transcoding. The monitoring system sends updates to the transcoding policy control engine, such as PDP/PEP 114 or 214, which may in turn further adjust the transcoding rate.

FIG. 4 is a flowchart illustrating a process for using video transcoding data and QoE feedback according to one embodiment. In step 401, a video transcoder inserts a header extension or equivalent data into the video data packets. The header extension may carry data associated with original and adapted video data, such as the codec, bit-rate, and resolution for the original data received at the transcoder from the video source, and the codec, bit-rate and resolution of the transcoded video data that is sent from the transcoder to the UE. The header extension would be ignored by the UE, which would not need the extended header information to process and display the video data. In step 402, a network monitoring system monitors the transcoder extension data in the header. Using the data in the video header extension, in step 403, the network monitoring system incorporates knowledge of the video transcoding directly into troubleshooting tools. The network monitoring system may generate a session analysis or a protocol analysis based upon the video data packets.

The network monitoring system provides network-wide, aggregate views of the impact of transcoding on QoE in step 404. The network monitoring system further identifies any abnormal impact from the transcoding in step 405. An analysis engine or other troubleshooting tool may be used in the network monitoring system to identify a drop in QoE or a poor QoE that results from the transcoding. In step 406, the network monitoring system sends updates to the transcoding policy control engine. The transcoding policy engine may adjust the transcoding currently being implemented in the network as a result of the feedback from the network monitoring system.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for evaluating a user Quality of Experience (QoE) in a wireless network, comprising:
capturing data packets from network interfaces in the wireless network;
identifying video sessions associated with the captured data packets;
monitoring key parameters for the video sessions within the captured data packets;
determining an effective throughput per video session based upon the key parameters;
calculating a QoE score for one or more users associated with the video sessions based upon the effective throughput per video session; and
inserting a header extension into transcoded video data packets associated with the video sessions;
evaluating an impact of video transcoding on the QoE; and
sending updates to a transcoding policy engine, the updates identifying the impact of video transcoding on QoE.

2. The method of claim 1, wherein the key parameters comprise one or more of a video bit rate, a number of resent video data packets, a number of failed video data packets, and a video session duration.

3. The method of claim 1, further comprising:
determining a video bit rate for each of the video sessions; and
calculating the QoE score based at least in part upon the video bit rate for one or more video sessions.

4. The method of claim 1, further comprising:
detecting occurrences of resent or failed video data packets; and
calculating the QoE score based at least in part upon a number of resent or failed video data packets.

5. The method of claim 1, further comprising:
determining a duration of a selected video session; and
calculating the QoE score based at least in part upon the duration of the selected video session.

6. A system for evaluating user Quality of Experience (QoE) in a wireless network, comprising:
a plurality of monitoring probes coupled to one or more network interfaces, the monitoring probes adapted to capture data from the network interfaces; and
a processor adapted to analyze the data captured from the network interfaces, the processor operating to:
identify video data within the data captured from the network interfaces;
identify one or more video sessions associated with the video data;
determine an effective throughput for the one or more video sessions; and
determine a QoE score for one or more users associated with the video sessions, the QoE score based upon the effective throughput of the one or more video sessions;
detect resent or failed video data packets associated with the one or more video sessions; and
determine the effective throughput for the video sessions based at least in part upon the resent or failed video data packets; and
a video transcoding device coupled to the network interfaces and under control of a network policy management entity, the video transcoding device adapted to modify a data rate for the video data, the video transcoding device further adapted to insert summary data into video data packets.

7. The system of claim 6, the processor further operating to:
identify key parameters within the video data; and
determine the effective throughput for the video sessions based at least in part upon the key parameters.

8. The system of claim 6, the processor further operating to: determine video bit rates for the one or more video sessions; and determine the effective throughput for the video sessions based at least in part upon the video bit rates.

9. The system of claim 6, the processor further operating to: detect durations of the one or more video sessions; and determine the QoE score based at least in part upon the durations of the video sessions.

10. The system of claim 6, wherein the summary data is inserted into video data packets as a header extension.

11. The system of claim 6, wherein the summary data comprises: data associated with original and adapted video data, including a codec, bit-rate, and resolution for original data received at the video transcoding device from a video source, and a codec, bit-rate, and resolution of transcoded video data that is sent from the video transcoding device to a user.

12. The system of claim 6, the processor further operating to: monitor the transcoding summary data in the video data packets; and determine an impact of video transcoding on the QoE score for the one or more users.

13. The system of claim 12, the processor further operating to: send feedback to the network policy management entity, the feedback indicating the impact of the video transcoding.

14. A system for monitoring effects of video transcoding on user Quality of Experience (QoE) in a wireless network, comprising:
  a video transcoding device adapted to modify a data rate for video data packets being sent through the wireless network to wireless network subscribers, the video transcoding device further adapted to insert summary data into video data packets;
  a network policy management entity adapted to enforce policies associated with the wireless network, the network policy management entity coupled to the video transcoding device and providing information regarding transcoding of the video data packets;
  a plurality of monitoring probes coupled to one or more network interfaces, the monitoring probes adapted to capture video data packets from the network interfaces and further comprising a processor adapted to analyze the captured packets, the processor operating to:
    determine a first QoE score for one or more subscribers, the first QoE score associated with video data that has not been transcoded in the video transcoding device;
    determine a second QoE score for the one or more subscribers, the second QoE score associated with video data that has been transcoded in the video transcoding device;
    identify an impact on network QoE due to video transcoding by comparing the first and second QoE scores; and
    generate feedback messages to the network policy management entity, the feedback messages comprising information associated with the impact on network QoE due to video transcoding.

15. The system of claim 14, wherein the network policy management entity is further adapted to enforce the policies by controlling video transcoding parameters implemented by the video transcoding device.

16. The system of claim 14, wherein the network policy management entity is further adapted to enforce the policies by limiting video transcoding parameters that the video transcoding device is allowed to adjust.

17. The system of claim 14, wherein the summary data comprises: data associated with original and adapted video data, including a codec, bit-rate, or resolution for original data received at the video transcoding device from a video source, and a codec, bit-rate, or resolution of transcoded video data that is sent from the video transcoding device to subscribers; and wherein the processor further operating to: associate the summary data with the first QoE score and the second QoE score to identify the impact on network QoE due to video transcoding.

18. A system for evaluating user Quality of Experience (QoE) in a wireless network, comprising:
  a plurality of monitoring probes coupled to one or more network interfaces, the monitoring probes adapted to capture data from the network interfaces; and
  a processor adapted to analyze the data captured from the network interfaces, the processor operating to:
    identify one or more video sessions associated with the video data;
    monitor transactional and temporal characteristics of the video sessions;
    determine a QoE score for one or more users associated with the video sessions, the QoE score based upon the transactional and temporal characteristics of the video sessions;
    evaluate an impact of video transcoding on the QoE; and
    send updates to a transcoding policy engine, the updates identifying the impact of video transcoding on QoE.

19. The system of claim 18, wherein the transactional and temporal characteristics comprise one or more characteristics selected from the group consisting of: an original video bit rate; a transcoded video bit rate; an effective throughput for the video session; and a duration of a video session.

20. The system of claim 18, wherein the transactional and temporal characteristics comprise one or more characteristics selected from the group consisting of: a number of failed video packets; a number of resent video packets; a number of video session restarts; a number of video session aborts; and a number of starts and stops during a single video session.

21. The system of claim 18, wherein the transactional and temporal characteristics comprise a temporal throughput distribution for a video session, the temporal throughput distribution determined based upon spikes, halts and buffering in a video session.

* * * * *